Dec. 26, 1950  J. H. CARPENTER  2,535,194
FORWARD AND REVERSE TRANSMISSION GEARING
Filed June 1, 1949  4 Sheets-Sheet 1
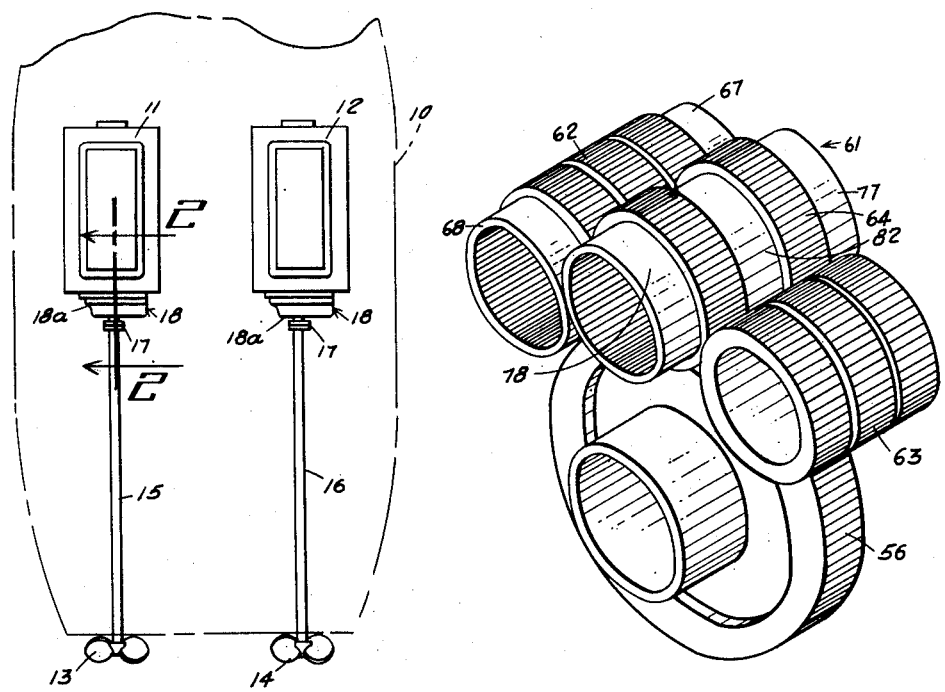
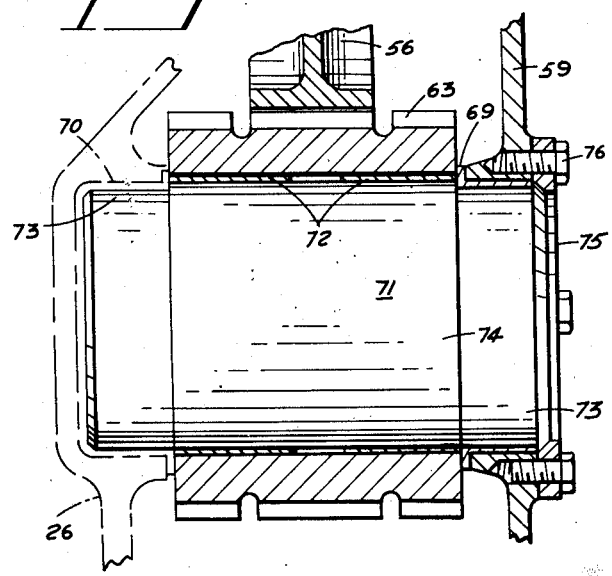
INVENTOR.
JOHN H. CARPENTER.
BY
Alden L. Redfield
ATTY.

INVENTOR.
JOHN H. CARPENTER.
BY
Alden L. Redfield,
ATTY.

Dec. 26, 1950  J. H. CARPENTER  2,535,194
FORWARD AND REVERSE TRANSMISSION GEARING

Filed June 1, 1949  4 Sheets-Sheet 3

INVENTOR.
JOHN H. CARPENTER.
BY
Alden D. Redfield,
ATTY.

INVENTOR.
JOHN H. CARPENTER.
BY Alden D. Redfield,
ATTY.

Patented Dec. 26, 1950

2,535,194

UNITED STATES PATENT OFFICE 2,535,194

FORWARD AND REVERSE TRANSMISSION GEARING

John H. Carpenter, Williamsport, Pa., assignor to Avco Manufacturing Corporation, Cincinnati, Ohio, a corporation of Delaware Application June 1, 1949, Serial No. 96,509

5 Claims. (Cl. 74—355)

The invention relates to transmission mechanisms for interchangeable assembly with power output shafts to be driven in either a clockwise or counter-clockwise direction respectively.

The transmission mechanism of the present invention is particularly adapted to be used in connection with multi-engine installations for marine crafts, wherein a number of screws are utilized for propulsion. The engines in these installations are generally designed to rotate in one direction, while the propellers on either side of the keel are desirably driven in a direction opposite to each other. It is therefore an object of the present invention to provide a transmission mechanism which is adjustable to drive a shaft in either a clockwise or counter-clockwise direction.

Another object of the invention is to provide a unitary mechanism for transmitting rotation to a shaft in a desired direction irrespective of the direction of rotation of the power input shaft.

Another object of the invention is to provide an interchangeable transmission mechanism for driving shafts contra-rotationally relative to the directional rotation of a power input shaft.

Another object of the invention is to provide in a multi-engine installation, including two or more propeller shafts, an interchangeable transmission mechanism for effecting rotation of the output or propeller shafts in any selected direction irrespective of the direction of rotation of the engines.

Another object of the invention is to provide a transmission mechanism, including an annular group of pinions, wherein the various pinions of the group are alternately power input or idler gears depending upon the position in which they are placed with respect to the direction of rotation of the power output shaft.

Another object of the invention is to provide means for adjustably equalizing tooth-loads on gear elements in a transmission for changing the directional rotation of a power output shaft.

Other objects and features of the invention will appear more fully from a consideration of the following detailed description in connection with the accompanying drawings wherein:

Figure 1 is a diagrammatical view of a multi-engine marine craft, having a pair of engines provided with interchangeable transmission mechanisms constructed according to the principles of the present invention;

Figure 5 is a cross sectional view taken along the line 5—5 of Figure 4, looking in the direction of the arrows, and showing the structure for equalizing tooth-loads on the gears of the mechanism; and Figure 6 is a perspective view of the gears housed in the rear section of the transmission, showing the gear teeth arrangement of the pinions and the spur gear.

Figure 2:
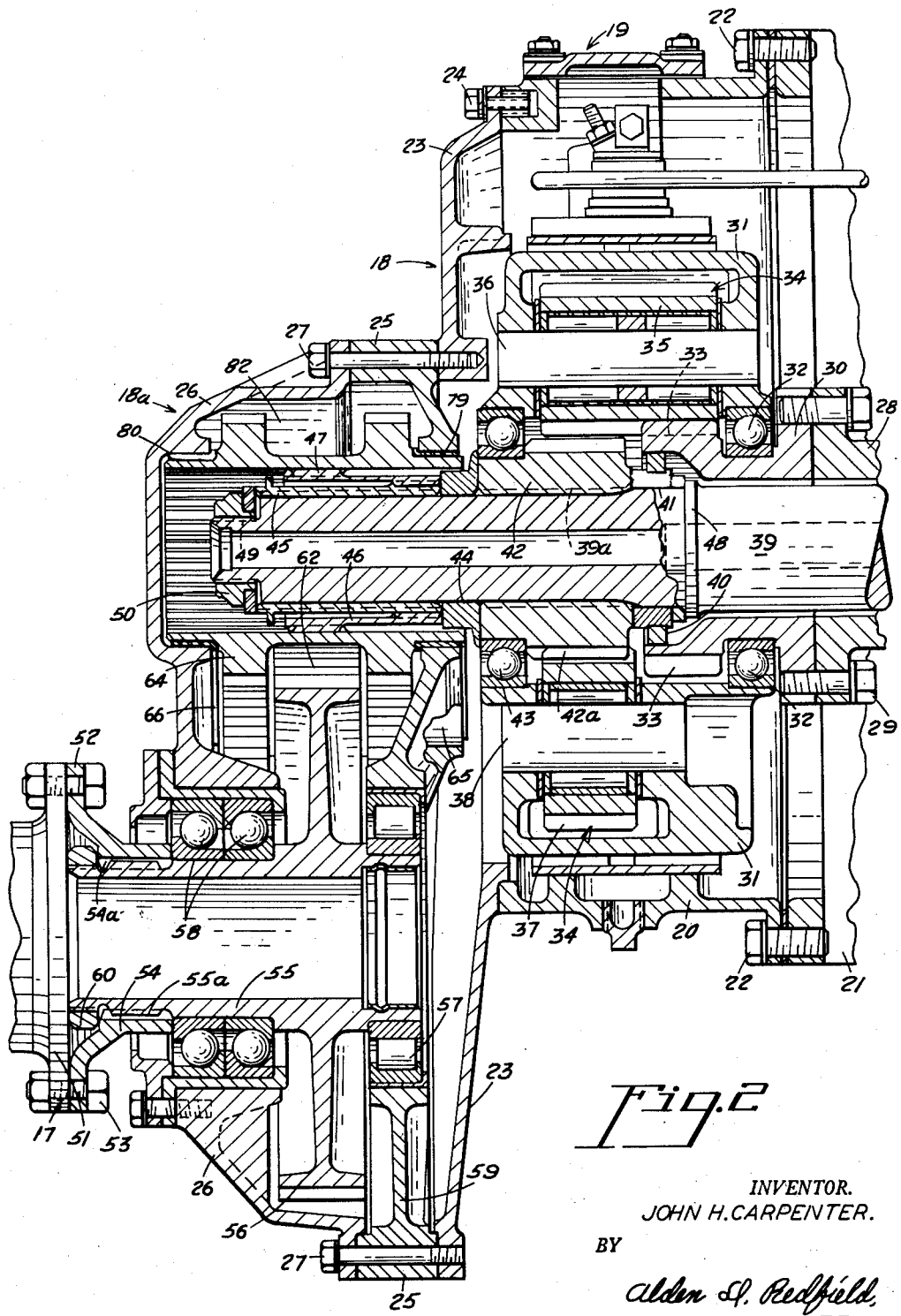
Figure 2 is a vertical cross sectional view taken along the line 2—2 of Figure 1.

Briefly described the invention comprises a series of driven pinions so mounted and arranged within an easily accessible casing of a transmission, that they may be removed and repositioned for interchangeable assembly with a driven shaft to be rotated in a clockwise or counter-clockwise direction.

Referring specifically to Figure 1 of the drawing wherein the invention is disclosed in association with the power plant of a marine craft, 10 designates the hull of a vessel powered by a pair of engines 11 and 12, each of which is connected with one of the propellers 13 and 14. For reasons well known in the art the propellers and propeller shafts 15 and 16, are driven contra-rotationally with respect to one another and are connected by couplings 17 to engine driven transmissions 18. In crafts powered by multi-engine installations, including aircraft, it has been found to be of particular advantage to have the power units therefore constructed with interchangeable parts. The rear sections of these transmissions, each of which is identical with the other, are designated by the reference character 18a in Figure 2. These, with minor adjustments may be interchangeably positioned for transmitting power to either a right or left hand driven shaft.

Referring to Figure 2 the transmission 18 is enclosed in a sectional casing 19 comprising: a front section 20, mounted directly to the rear housing 21 of either of the engines 11 and 12 as by bolts 22; an intermediate section 23, retained to the front section by bolts 24; a rear section 25 and cover 26 removably mounted to the intermediate section 23 by bolts 27. The rear section 18a comprises casing section 25 and cover 26 together with the gearing contained therewithin as will presently be described.

The mechanism of the transmission is driven by an engine crankshaft 28 connected as by bolts 29 to a driven sleeve 30. This sleeve is journaled in a webbed carrier 31, retained by bearing 32 and has an external gear 33 for driving an annular group of reversing gears 34.

The annular group of reversing gears comprise a first series of alternately spaced followers 35 having gear teeth thereon, said followers being journaled on studs 36 mounted upon carrier 31. The teeth of gears 34 mesh with the external gear 33 of the driven sleeve. A second series of alternately spaced followers 37 having gear teeth formed thereon are similarly journaled upon a set of studs 38 fixed to the webbed carrier 31 in meshed relation with the first mentioned series of followers 35.

A drive shaft 39 having splines 39a thereon is journaled within the sleeve 30 by a friction bearing 40 which is retained by a ring 41. A gear member 42 drives this shaft through splines 39a and is journaled upon the webbed carrier 31 through bearing 43. A set of gear teeth 42a are formed exteriorly on the member 42, for engagement with the set of followers 37, to transmit the rotation of the engine crankshaft 28 to the drive shaft 39 and thence to the selectable gear elements housed in the casing rear section 25.

The shaft 39 extends through the intermediate section 23 to the rear section 25 of the casing 19 and has mounted thereon a spacer 44 and has splined thereto a flanged sleeve 45. This sleeve has an exteriorly formed gear portion meshing with a quill shaft 46 which in turn has splines 47 formed on its exterior surface.

A shoulder 48 retains the members mounted on the shaft 39 in cooperation with threads 49 engaged to a nut 50.

As shown in Figure 2, coupling 17 may comprise a pair of flanges 51 and 52 secured by a group of conventional bolts 53. Flange 52 is tapered to form a sleeve 54 which is splined to a hub 55 of a spur gear 56. The hub is mounted for rotation by bearings 57 and 58 retained in wall 59 and the cover section 26. Splines 54a and 55a secure sleeve 54 to the hub 55 of the spur gear against relative rotation with longitudinal movement being restricted between the sleeve and gear member by nut 60.

An annular group of pinions 61 (see Figures 3, 4 and 6) are positioned between the spur gear 56 and drive shaft 39 for driving one of the related shafts 15 and 16, and comprise: spaced pinions 62 and 63, removably supported by the wall 59 and cover 26 (see Figure 5), and positioned in meshed relationship with the spur gear 56; an intermediate pinion 64, similarly supported by the wall and cover and positioned between the pinions 62 and 63 and in meshed relationship therewith. It will be observed in Figure 6 that the pinions 62, 63 and 64 have axially spaced series of teeth, the center space of pinion 64 being provided with a groove 82 and the ends of pinions 62 and 64 being provided with shoulders 67, 68 and 77, 78 respectively. The pinions of group 61 are removably journaled in a series of bearings mounted in the wall and cover section of the casing 19, and comprise: bearings 65 and 66 which frictionally support the pinion 62 on opposing shoulders 67 and 68 of this gear (see Fig. 2); bearing sleeves 69 and 70 which retain the pinion 63 (see Fig. 5). The last mentioned pinion is similar to the pinion 62, but is journaled on a stub shaft 71 and rotatable thereon by bearings 72. For a purpose to be later described, the opposed bearing surfaces 73 of stub shaft 71 are eccentric with respect to the axis of the central portion 74 of the shaft which is removably secured against rotation by a plate 75 retained in the wall 59 by bolts 76. With reference to the intermediate pinion 64, it is retained in the cover and wall section of the casing in a manner similar to pinion 62, by opposing shoulders 77 and 78 thereof rotationally supported by bearings 79 and 80 respectively fixed in the casing section 25 and cover 26.

Figure 3:
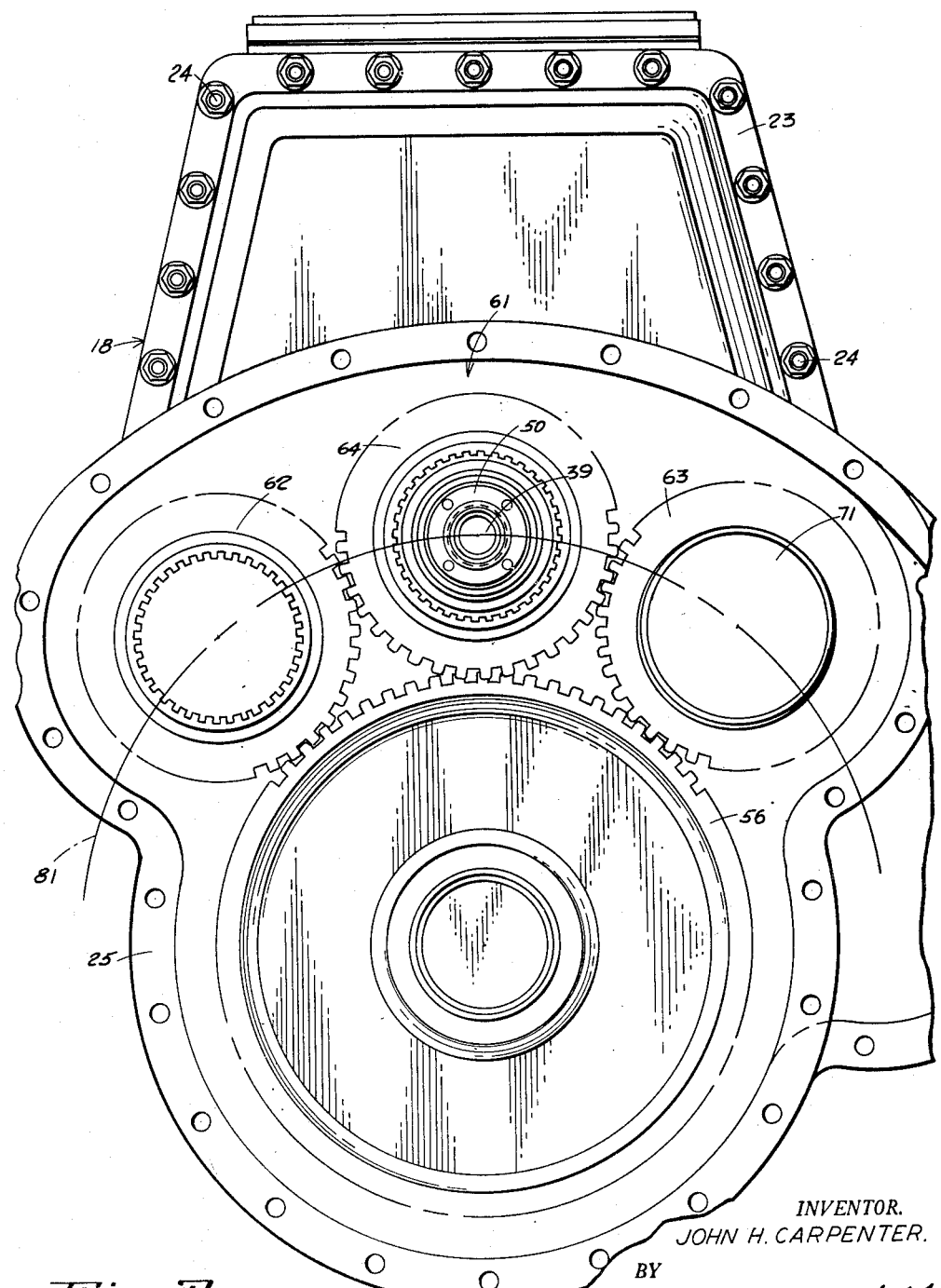
Figure 3 is a rear elevational view of the transmission mechanism with the casing cover removed, showing the rear section positioned for driving a propeller shaft in one direction.
Figure 4:
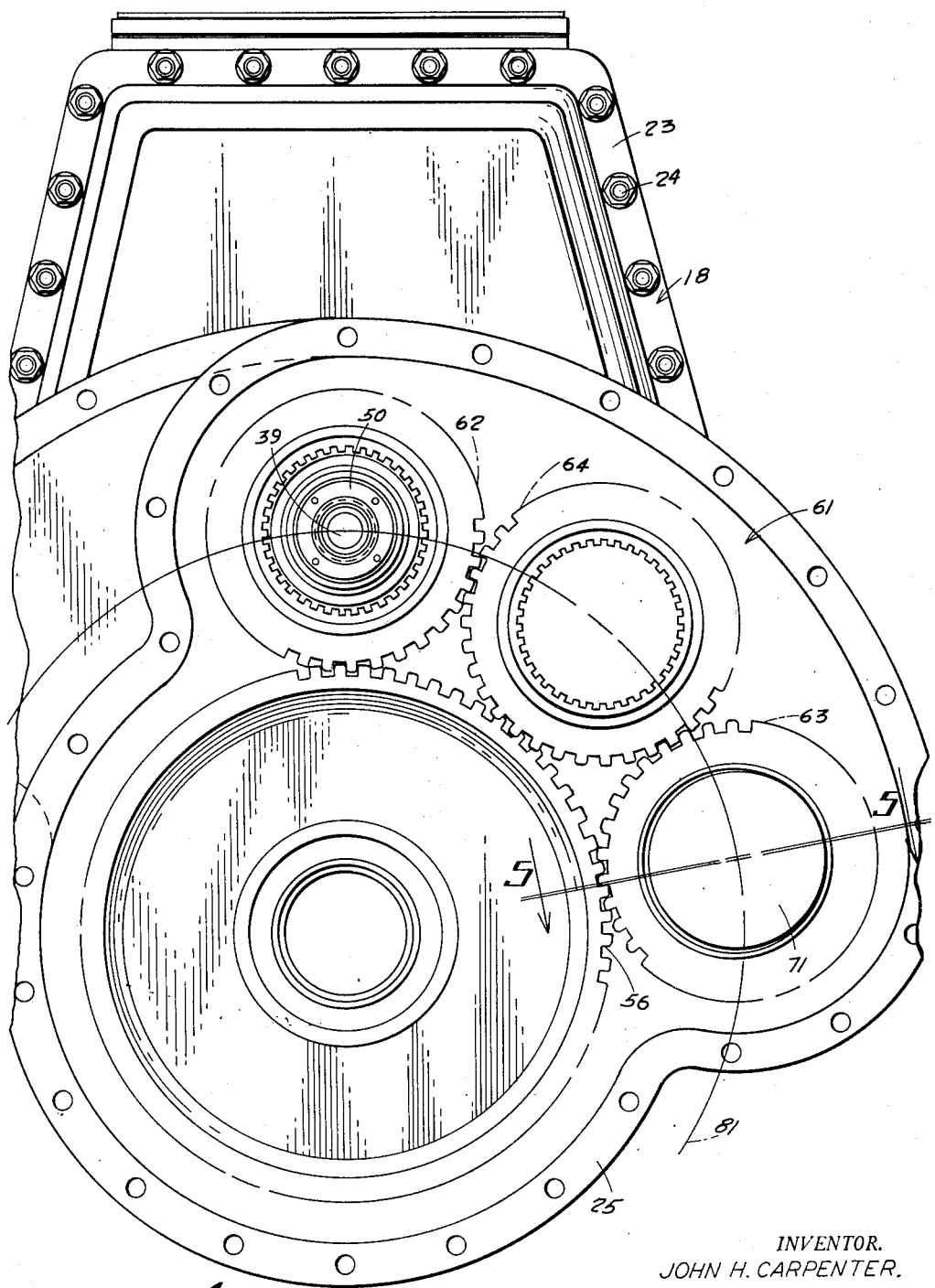
Figure 4 is a rear elevational view of the transmission mechanism with the casing cover removed, showing the rear section positioned for driving a propeller shaft in an opposite direction to that of the structure in Figure 3.

As indicated in Figures 3, 4 and 6, the annular group of pinions 61 are positioned on a common arc 81 centered on the axis of the spur gear 56, with the spaced pinions 62 and 63 meshing with the intermediate pinions 64 and the teeth of the spur gear. The groove 82 formed centrally in the pinion 64 insures nonengagement between the spur gear and pinion 64 yet the adjacent teeth provide engagement of the pinion 64 with the spaced pinions 62 and 63. Pinion 64 and one of the spaced pinions, pinion 62, have interior surfaces splined for removable engagement with the splines 47 of quill shaft 46.

As shown by Figures 2, 3, and 4 of the drawings, the cover 26 and rear section 25 may be revolved about the axis of the spur gear 56, with respect to the front section 20 and intermediate section 23 of the casing, and in conjunction with the pinions 62, 63 and 64 may be revolved to a position in which the spur gear 56 may be rotated alternately in opposite directions through the engagement of either pinion 62 or 61, with shaft 39 through quill shaft 46. When the rear sections are relatively positioned with respect to the forward casing sections as shown in Figure 3, with the intermediate pinion 64 connected to the shaft 39 by splines 47 on quill shaft 46, a clockwise rotation of the shaft 39 would cause the related propeller shaft to rotate in a like direction. On the other hand, when the rear sections of the casing are revolved about the axis of the spur gear 56 to position the spaced pinion 62 in engagement with quill shaft 46 (driven by shaft 39, see Figure 4) so that a clockwise rotation of shaft 39 effects a counter-clockwise rotation of the spur gear 56, or a shaft coupled thereto.

Although the structures of the pinions, including pitch diameters, are substantially similar, one of the spaced pinions, pinion 63, has certain additional features incorporated to adjust backlash, so that all pinions in the group 61 will assume their portion of the tooth load when the driving member is shifted from pinion 62 to pinion 64, or vice-versa. As previously indicated, pinion 63 is journaled on a stub shaft 71 which has opposing supporting surfaces eccentric with respect to the axis of the central portion 74, upon which bearings 72 and pinion 63 is supported. By removing the plate 75, the stub shaft 71 may be rotated to change the depth of engagement of the teeth of pinion 63 with the teeth on the spur gear 56 and pinion 64. Replacing plate 75 locks the stub shaft in a favorable position for proper distribution of tooth load.

It is apparent that the quill shaft 46 and sleeve 45 may be eliminated from the structure of my transmission mechanism, by connecting the shaft 39 directly to either pinion 62 or 64, however it has been included in the present description as an advantageous way of providing for minor misalignment between shaft 39 and pinions 62 or 64.

Where the engines 11 and 12 turn their crankshafts 28 in a clockwise direction, as viewed from the rear of the engines, mounting my transmission mechanism, as shown in Figure 3, to the rear housing 21 of engine 11 would cause the shaft 15 and propeller 13 to rotate in a like direction. To rotate shaft 16 of engine 12 in a direction opposite to that of shaft 15, the rear section 25, with the cover 26 of the casing, is removed from section 23, thus slipping pinion 64 from splined engagement with the quill shaft 46. Sections 25 and 26 are then rotated about the axis of the spur gear 56 and pinion 62, instead of pinion 64 is engaged with quill shaft 46. In this position pinion 62 becomes the drive gear with respect to spur gear 56, while pinion 64 acts as an idler gear (Figure 4). Reassembling the bolts 27 to section 23, and connecting the propeller shaft to the flange 52, completes the interchangeable assembly of the transmission.

The invention exemplifies mechanisms for contra rotating propeller shafts including a novel arrangement of a group of pinions in relation to a driven spur gear. This is accomplished by providing means for adjusting the pinions about an arc centered on the gear and selectively engaging a drive shaft gear to one of the pinions, whereby the transmission mechanism may be arranged to drive the shaft either in a right or left hand direction depending upon which pinion of the group is selected for engagement with the drive shaft. The invention permits a great flexibility of choice in achieving any desired direction of rotation of an output shaft, regardless of the direction of rotation of the engine from which it derives power. This choice may be had by a simple mechanical adjustment by the user and obviates the necessity of installing expensive reversing transmissions by the addition or removal of extra parts.

The invention is not limited to the detailed marine installation illustrated on the specification and drawings but may be modified within the scope of the appended claims.

I claim:

1. Transmission mechanism for interchangeable assembly with a clockwise or counter-clockwise driven shaft comprising: a spur gear removably secured to said shaft; a pair of spaced pinions in mesh with said gear; an intermediate pinion engaged with said pinions; said pinions having journals located on a common arc centered on the axis of the spur gear; a drive shaft; means for removably securing said intermediate pinion to said drive shaft for rotation of said driven shaft in one direction; means for relocating the pinions on the arc, and means to removably secure one of the spaced pinions to the drive shaft for rotation of said spur gear and said driven shaft in the opposite direction.

2. In combination with an engine having a drive shaft which rotates in one direction at all times, a reversible transmission comprising a fixed casing adjacent said drive shaft; a revoluble casing removably secured to said fixed casing; a driven gear rotatably supported by said revoluble casing; a pinion rotatably supported by said revoluble casing; a pair of spaced pinions in meshed engagement with said first mentioned pinion, all of said pinions having equal pitch diameters and being rotatably supported by said revoluble casing with their axes of rotation equi-distant from the axis of rotation of said driven gear, said spaced pinions being in mesh with said driven gear at all times; means associated with said first named pinion and one of said spaced pinions to permit releasable engagement with the engine drive shaft, said revoluble casing being manually swingable about the axis of said driven gear to alternately engage said first mentioned pinion or spaced pinion with the drive shaft to produce opposed rotation of said driven gear at constant speed for any given engine speed.

3. Apparatus as defined in claim 2 and, in addition, an eccentric rotatable journal associated with said revoluble casing for adjustably supporting the other spaced pinion whereby the backlash may be adjusted between the other spaced pinion and the first mentioned pinion and driven gear.

4. Transmission mechanism for driving a shaft in opposite directions, comprising: a gear case including a supported housing; a spur gear journaled in the housing and securable to the shaft to be driven; a drive shaft, a sleeve coaxial with said drive shaft and driven thereby; an exteriorly splined quill shaft coaxial with said sleeve and driven thereby; a pair of spaced pinions meshing with said spur gear, one of said spaced pinions having splines on its interior surface for engagement with said quill shaft; a pinion positioned in mesh engagement with said first mentioned pinions and having an interior surface splined for engagement with said quill shaft; a series of bearings secured in the housing for rotatably supporting said pinions, said bearings being positioned with their axes on a circular arc having its center coincident with the axis of said spur gear; said supported housing being removably secured to said gear case for rotation about the axis of said spur gear to engage and disengage said quill shaft with either of the pinions provided with interior splines.

5. In combination with a reversible transmission for use with an engine having a drive shaft which rotates in one direction at all times; a driven gear designed for rotation in both clockwise and counterclockwise directions; a revoluble casing for rotatably supporting said driven gear; a pair of pinions of equal pitch diameters in meshed engagement and rotatably supported by said revoluble casing, said pinions having their axes of rotation equi-distant from the axis of rotation of said driven gear, one of said pinions being in meshed engagement with said driven gear at all times; means associated with said pinions permitting removable engagement with the drive shaft; said revoluble casing being manually swingable about the axis of said driven gear to alternately engage said pinions with the drive shaft to produce opposed rotation of said driven gear at constant speed for any given engine speed.

JOHN H. CARPENTER.

REFERENCES CITED

The following references are of record in the file of this patent:

UNITED STATES PATENTS

| Number | Name | Date |
| --- | --- | --- |
| 819,334 | Brown | May 1, 1906 |
| 965,408 | Reno | July 26, 1910 |
| 1,815,034 | Boughton | July 21, 1931 |
| 2,437,314 | Berndtson | Mar. 9, 1948 |
| 2,469,743 | Newton | Mar. 10, 1949 |